June 30, 1970   J. A. WERNER ET AL   3,517,534
APPARATUS FOR WORKING TUBES
Original Filed Aug. 15, 1966   10 Sheets-Sheet 1

INVENTOR
JOHN A. WERNER
KENNETH A. SCHAEFER

ATTORNEY

FIG. 5

INVENTOR
JOHN A. WERNER
KENNETH A. SCHAEFER

ATTORNEY

INVENTOR
JOHN A. WERNER
KENNETH A. SCHAEFER

ATTORNEY

June 30, 1970  J. A. WERNER ET AL  3,517,534
APPARATUS FOR WORKING TUBES
Original Filed Aug. 15, 1966  10 Sheets-Sheet 10

INVENTOR
JOHN A. WERNER
KENNETH A. SCHAEFER

ATTORNEY

United States Patent Office 3,517,534
Patented June 30, 1970

3,517,534
APPARATUS FOR WORKING TUBES
John A. Werner, Wauwatosa, and Kenneth A. Schaefer, Brookfield, Wis., assignors to Koehring Company, Milwaukee, Wis., a corporation of Wisconsin
Original application Aug. 15, 1966, Ser. No. 572,336. Divided and this application July 16, 1969, Ser. No. 842,311
Int. Cl. B21d 22/14
U.S. Cl. 72—83
9 Claims

ABSTRACT OF THE DISCLOSURE

A tubular metal blank is chucked at one end to a rotating mandrel and subjected to radial and axial deforming pressure by circumferentially spaced rollers, the working depth of each roller being precisely determined by adjustable gauge means which cooperate with the piston rod of an hydraulic shift cylinder for the roller and limit its in-feed toward the mandrel. A mechanism for loading work pieces upon the mandrel and unloading them therefrom is shiftable back and forth axially of the mandrel by a back and forth shiftable tail stock of the apparatus.

---

This application is a division of our application Ser. No. 572,336 filed Aug. 15, 1966 for Method and Apparatus for Working Tubes now abandoned.

The present invention relates to the rolling of tubular metal blanks into cylinders having an extremely smooth finish, particularly on their inside, and being axially straight and circumferentially round within close tolerances.

Generally it is an object of the invention to provide an improved apparatus for working metal tubes and like work pieces, which is realtively simple in construction, efficient in operation and which lends itself to manufacture at relatively low costs.

More specifically, it is an object of the invention to provide an improved apparatus of the mentioned character incorporating a rotary mandrel, a plurality of circumferentially spaced rollers about the mandrel for exerting radial and axial deforming pressure upon a tubular blank chucked at one end to the mandrel, and selectively adjustable gauge means for determining different predetermined working depths of the rollers, the gauge means being mounted on a carriage frame for the rollers and operatively interposed between the cylinder and piston rod of a shift ram for each roller, so as to limit the in-feed of the shift ram toward the mandrel.

A further object of the invention is to provide an improved tube working apparatus of the above mentioned character incorporating a horizontally shiftable tail stock for steadying the rotating mandrel, and a loading mechanism for manipulating tubular work pieces upon the mandrel and removing them therefrom, the loading mechanism being shiftable back and forth axially of the mandrel by back and forth movement of the tail stock, and successively operable first, to position a work piece between the retracted tail stock and the mandrel in axial alignment with the latter; second, to move the work piece upon the mandrel by forward movement of the tail stock; third, to withdraw the work piece from the mandrel by retraction of the tail stock; and finally, to remove the withdrawn work piece from the space between the mandrel and the retracted tail stock.

These and other objects and advantages are attained by the present invention, various novel features of which will be become apparent from the description herein of a preferred embodiment of the invention, and will be pointed by the appended claims.

Referring to the accompanying drawings.

Referring to FIGS. 1 through 4 of the drawings, there is illustrated an improved tube working machine 20 according to the present invention.

Figure 1:
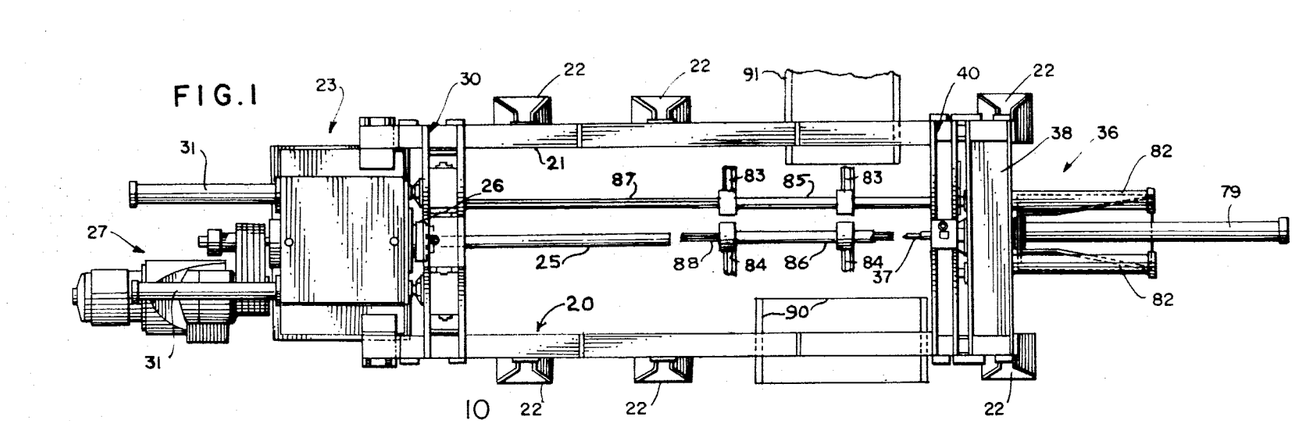
FIG. 1 is a plan view of the improved tube working apparatus according to the present invention illustrated in the unloaded condition.
Figure 2:
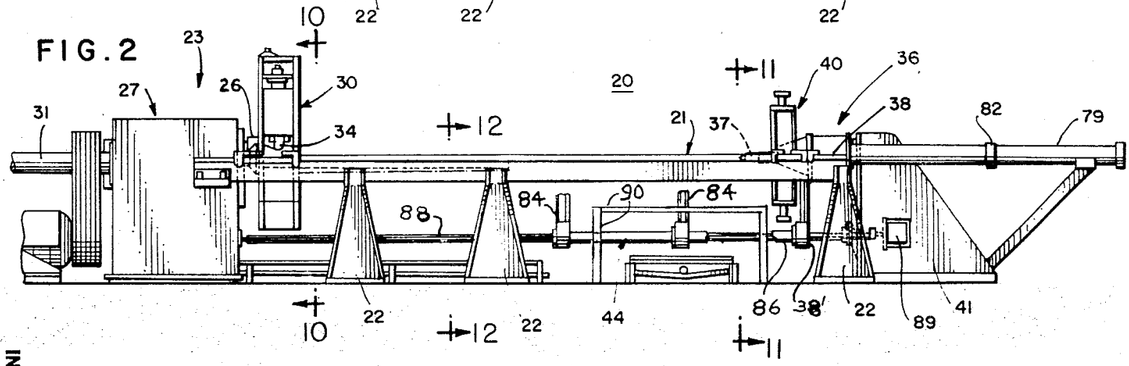
FIG. 2 is an elavational view of the tube working apparatus in FIG. 1.
Figure 3:
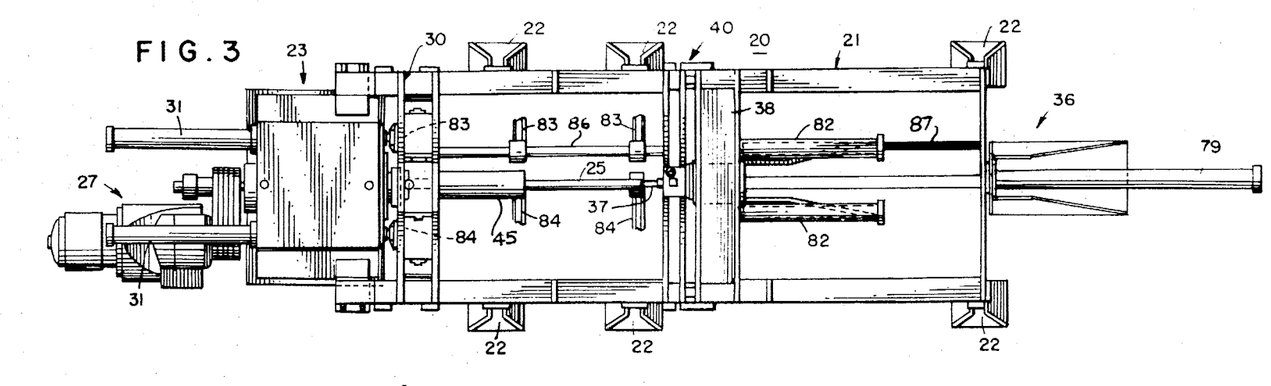
FIG. 3 is a plan view of the tube working apparatus according to FIG. 1 but illustrated in a loaded condition.
Figure 4:
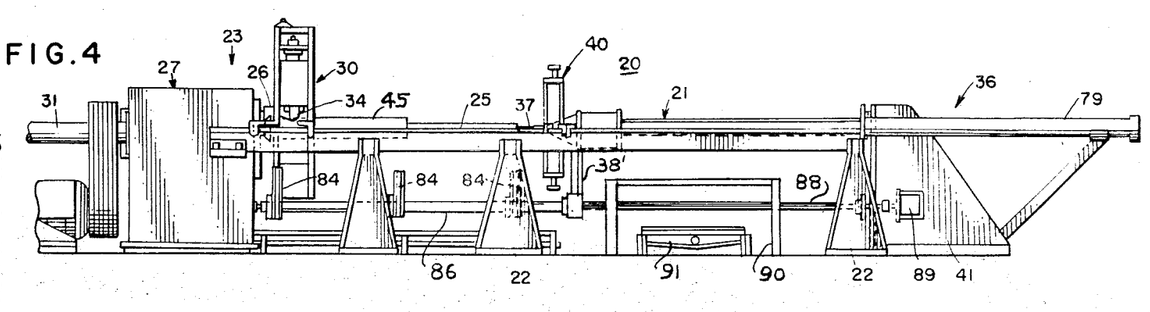
FIG. 4 is an elevational view of the tube working apparatus according to FIG. 3.

FIGS. 1 and 2 showing the machine in its "at rest" or unloaded condition, and FIGS. 3 and 4 showing it in its operative condition. The machine 20 includes a machine bed 21 rigidly supported at a plurality of points by a suitable frame, here illustrated in the form of a plurality of posts 22. At one end of the bed 21 is a machine head assembly 23 including suitable means for securing an overhanging elongated mandrel 25, a chuck 26 for gripping a work piece, and suitable drive means 27 for turning the mandrel 25 and chuck 26.

Slidably mounted on the machine bed 21 for horizontal back and forth movement toward and away from the head assembly 23 is a tool carriage 30. A pair of transversely spaced hydraulic cylinders 31 are mounted on the head assembly 23 and are operable to slide the tool carriage back and forth on the bed 21.

Figure 10:
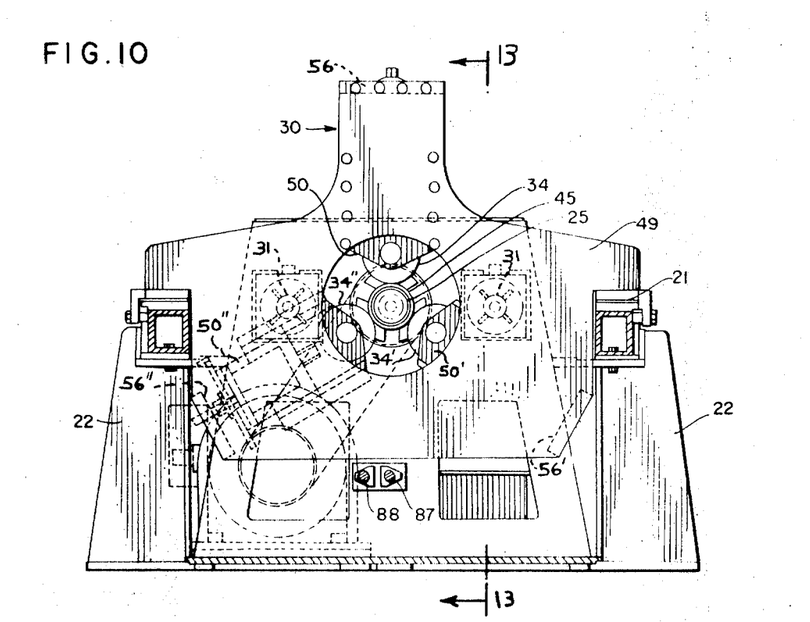
FIG. 10 is a sectional elevational view of the apparatus of FIG. 1, illustrating the head of the apparatus, and taken along line 10—10 of FIG. 2.

As best shown in FIG. 10, and as will be explained more fully hereinbelow, three forming rollers 34, 34' and 34" are mounted at 120 degree spacings from each other on the tool carriage 30 for back and forth adjustment radially toward and away from the mandrel 25.

At the end of the machine bed 21 opposite to the head assembly 23 is a tail stock assembly 36 provided with center means 37 engageable with the mandrel 25 and carried on a transverse support 38 riding on the machine bed 21. A work piece extractor assembly 40, also riding on the machine bed 21, is provided for pulling a completed work piece off the mandrel 25. The frame of the machine 20 also includes a fixed tail post 41 in rear of the tail stock assembly 36 and the extractor assembly 40. Additionally the machine 20 is provided with a work piece loading mechanism 44 for manipulating work pieces upon and from the mandrel 25.

Figure 5:
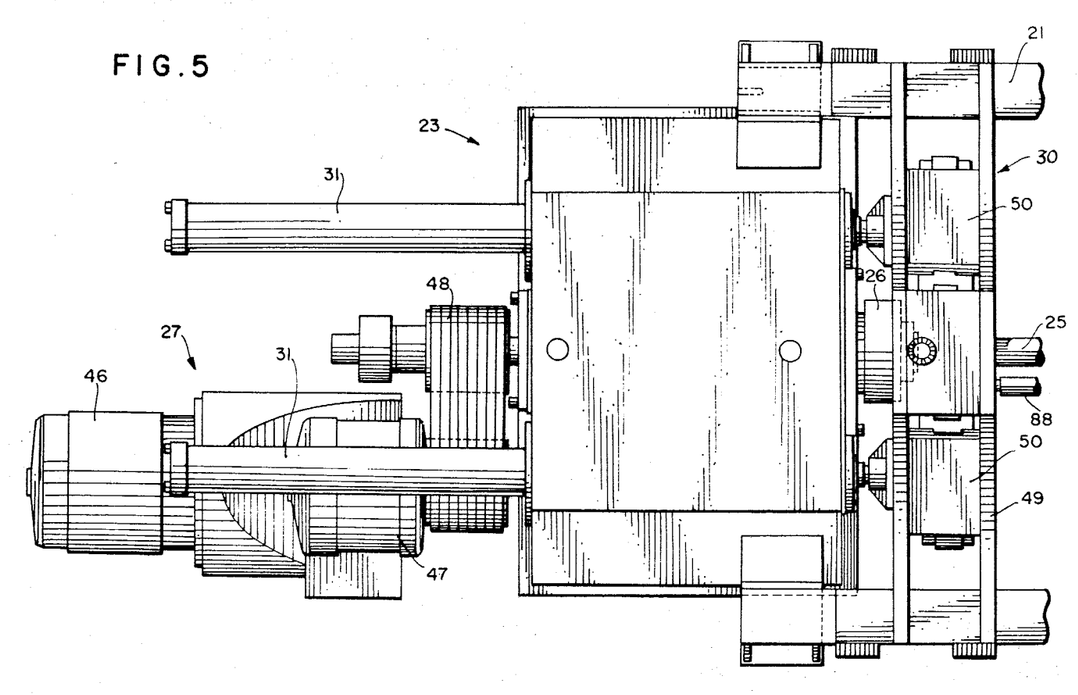
FIG. 5 is a fragmentary plan view of the tube working apparatus of FIG. 1, drawn to a larger scale, and illustrating the head end and tool carriage of the apparatus.
Figure 6:
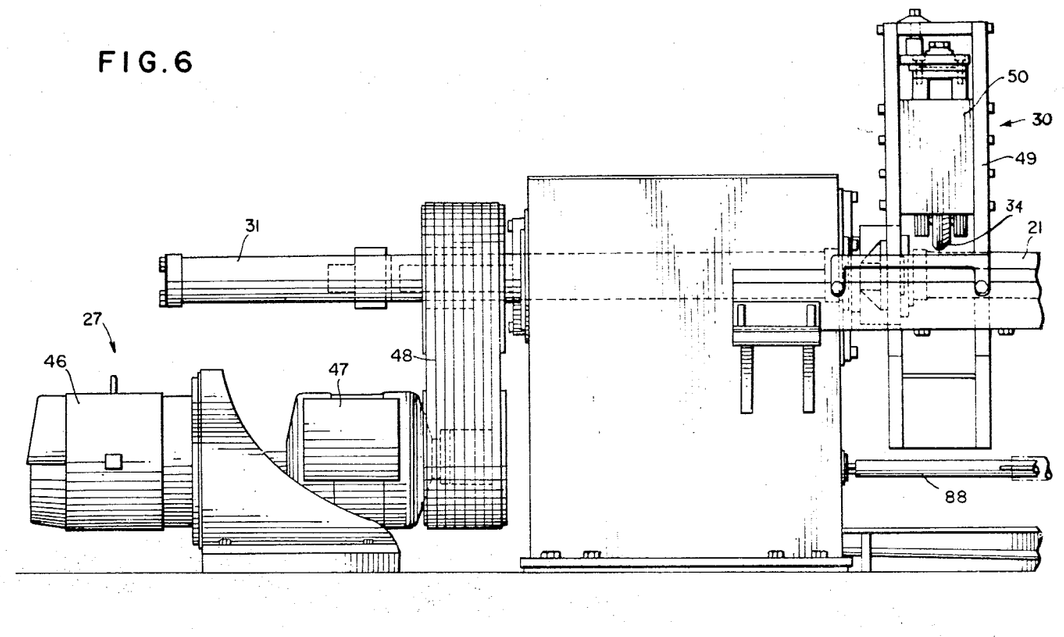
FIG. 6 is a side view of FIG. 5.

Referring to the machine head 23, as best illustrated in FIGS. 5, 6, and 10, the mandrel 25 is supported thereon in an overhanging position and rotatable on a horizontal axis which extends longitudinally of the bed 20. The head 23 also carries the rotary chuck 26 for clamping engagement with one end of a tubular work piece 45, FIG. 10. A suitable electric motor 46 acting through a fluid coupling or transmission 47 and a belt drive assembly 48 is provided for rotating the chuck 26 and mandrel 25 as a unit on the axis of the latter which defines a work axis for the tool carriage 30 and work piece 45. In a known manner, the head 23 includes suitable gearing for selectively controlling the rotational speed of the chuck and mandrel assembly.

Referring to FIGS. 5, 6, 10 and 13, the tool carriage 30 comprises a carriage frame 49 having vertical front and rear plates 55 which are connected at their upper ends by an end frame member 56 to define a yoke type structure. The forming rollers 34, 34' and 34" are mounted between the frame plates 55 on roller support assemblies 50, 50' and 50", respectively, at 120 degrees circumferential spacings from each other. The support assembly 50 for the roller 34 comprises a frame member 57 which is adjustably positioned from the end frame member 56 by suitable adjusting means such as the adjusting screw assembly 58. Moreover, to bias the roller 34 inwardly into the work piece, there is provided a suitable hydraulic ram or cylinder assembly 60. As shown in FIG. 14, the cylinder assembly 60 includes a cylinder member 61 closed at its ends and a piston 62 within the cylinder member 61. A pair of piston rods 63 and 64 are connected to the piston and extend out of opposite ends 66, 66' of the cylinder member 61. The piston rod 63 is connected to a yoke member 65 carrying the roller 34, while the other piston rod 64 extends through frame member 57 and through a slot 67 in a gauge block 68 (FIG. 15). The piston rod 64 terminates in an enlargement, here illustrated as a nut 69 threaded on the end of the piston rod 64 and defining a fine adjustment for the in-feed depth of the roller 34. It will be understood that the movement of the piston 62 downwardly toward the work axis of the machine will be limited by the nut 67 on the piston rod 64 coming into engagement with the gauge block 68.

Figures 13, 14, 15:
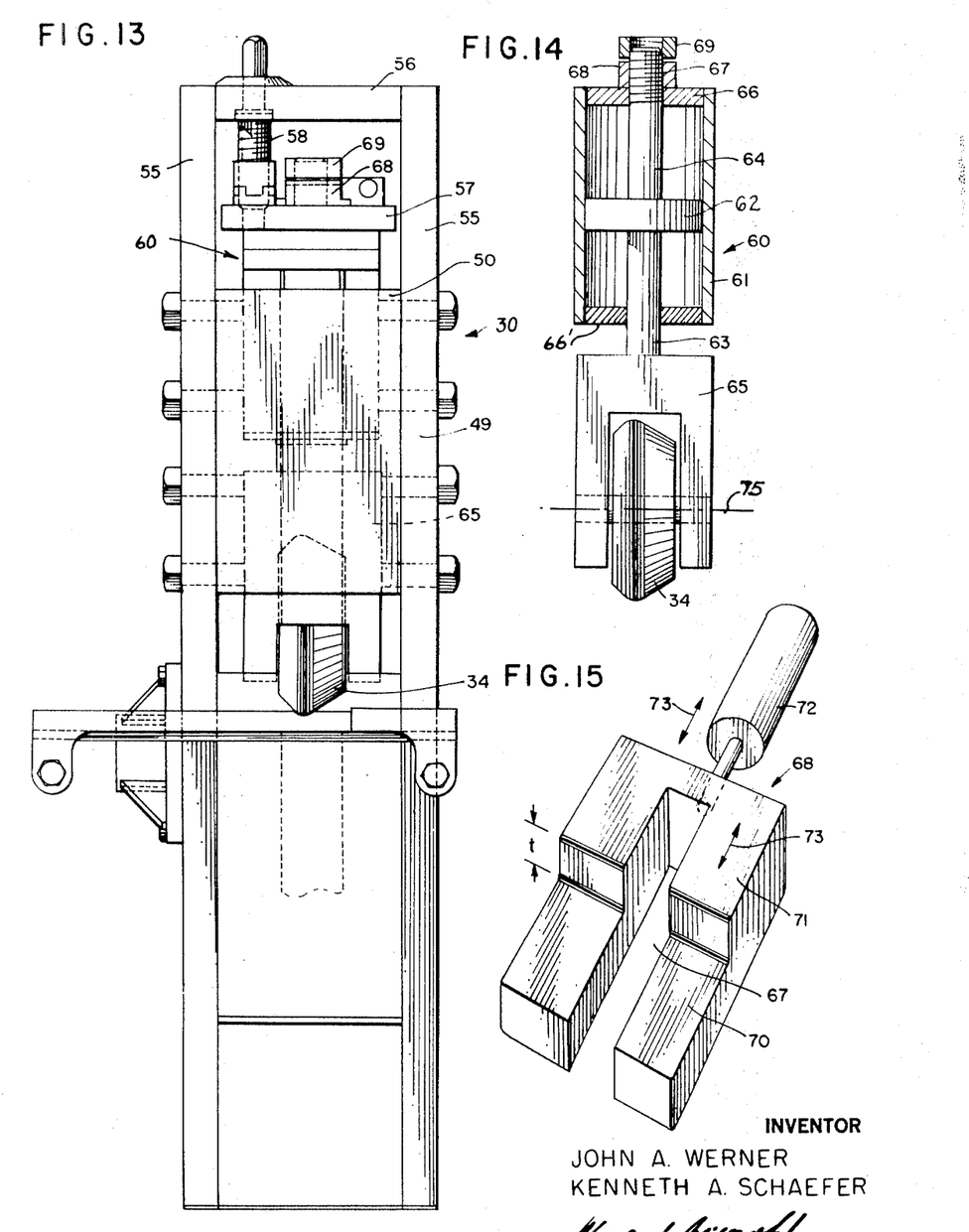
FIG. 13 is an enlarged elevational view on line 13—13 of FIG. 10, and illustrating a forming roller installation.
FIG. 14 is a sectional view of part of FIG. 13.
FIG. 15 is a perspective view of a gauge block and adjusting mechanism therefor.

To provide a pre-selected fixed depth to the second cut of the roller 34, the gauge block 68, as shown in FIG. 15, is provided with a transverse step defining two accurately gauged thickness portions 70 and 71. An hydraulic cylinder 72 is provided for shifting the gauge block 68 along its longitudinal axis, as indicated by the arrow 73 in FIG. 15, so that the nut 69 selectively seats against the portion 70 or the portion 71, the difference in thickness between the portions 70 and 71 designated by the reference character $t$ determining the thickness $t$ of the final pass of the roller 34.

Figures 12, 16:
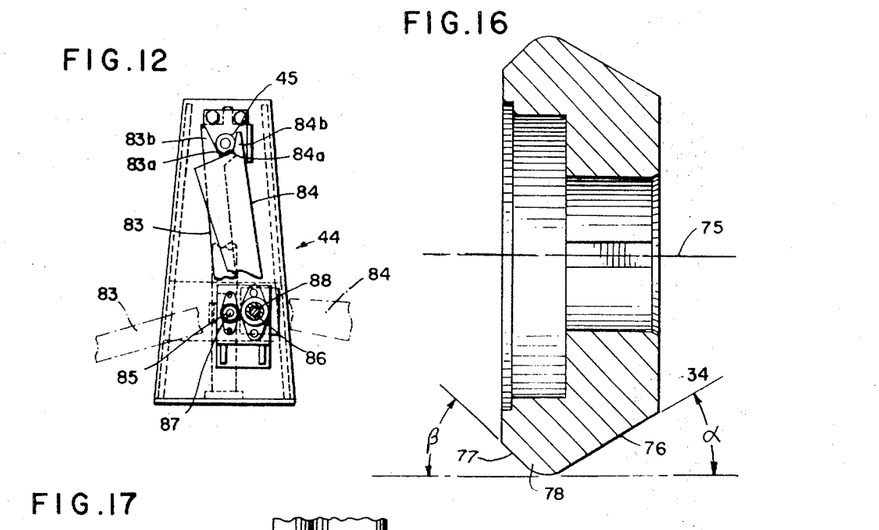
FIG. 12 is a fragmentary elevational view of the apparatus of FIG. 1, taken along line 12—12 of FIG. 2 and illustrating the work piece loading mechanism of the apparatus.
FIG. 16 is a cross sectional view of one of the forming rollers at an enlarged scale.
Figure 17:
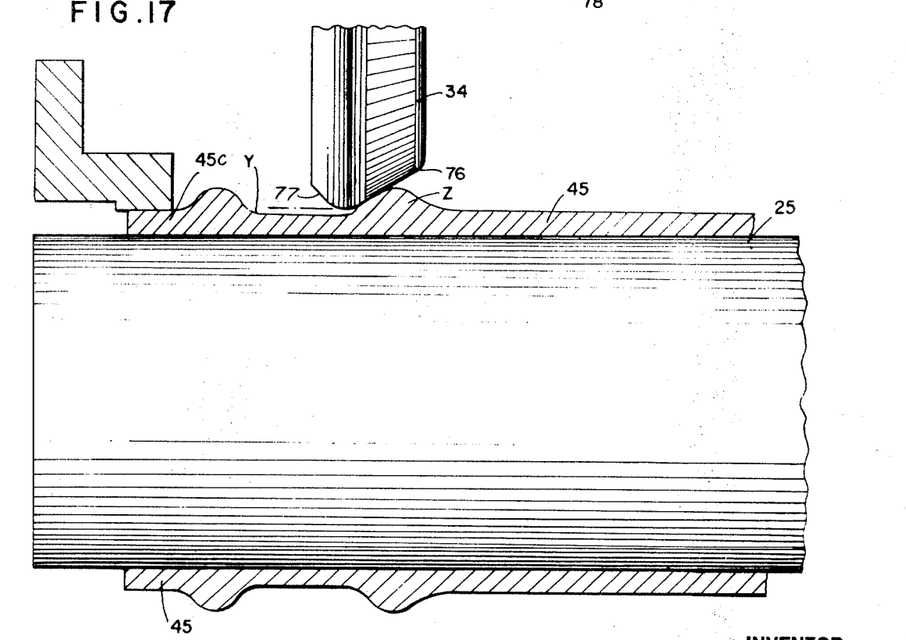
FIG. 17 is a fragmentary cross sectional view of a roller and work piece illustrating the action of the roller across the work piece.

Referring to FIGS. 14, 16 and 17, the roller 34 is mounted on an axis 75 carried by the yoke member 65 and generally parallel to the work axis of the machine 20. The face of the roller is provided with a forward chamfered taper 76 having a taper extending from the forward edge thereof radially outward toward the machine head to define a forward flow angle $\alpha$. An escape portion 77 is provided on the trailing edge of the roller 34 defining a rapid exit angle $\beta$ for the work metal. Additionally, a center portion 78 defined by a suitable radius interconnects the forward portion 76 with the escape portion 77. It has been found that a comparatively small entrance angle is preferred to properly squeeze the metal as illustrated by FIG. 17. In a preferred embodiment, the entrance angle $\alpha$ was 30°. However, angles in the range of 22° to 50° would provide satisfactory results. Additionally, a swift exit of the metal is preferred so that an exit angle $\beta$ of somewhat greater angle than the entrance angle is provided. In a preferred embodiment, the exit angle $\beta$ was 45°; however, an exit angle in excess of 40° would work satisfactorily. The rapid exit angle gets the metal out of and from under the roller 34 as rapidly as possible so that the roller does not hammer the metal. However, the radius of the center portion 78 is important in relation to maintaining the diametrical size of the finished product. It widens the band of variables, that is, it is easier to control the inside diameter of the finished work piece. Moreover, when metal flows under the small radius as indicated in FIG. 17, it is not packed or hammered down and thereby provides for a better finish.

The foregoing explanations with respect to the mounting, adjustment and functioning of the forming roller 34 analogously apply to the mounting, adjustment and functioning of the forming rollers 34' and 34". End frame members 56' and 56", corresponding to the end frame member 56, are connected to lower portions of the vertical frame plates 55 adjacent to the opposite, longitudinal sides, respectively, of the machine bed 21. The roller support assemblies 50' and 50" are adjustably connected, respectively, to the end frame members 56' and 56" by adjusting screw assemblies corresponding to the adjusting screw assembly 58 shown in FIG. 13; and each of the support assemblies 50' and 50" includes a roller adjusting cylinder, gauge block, stop nut and gauge block adjusting cylinder, corresponding to the cylinder 60, gauge block 68 and cylinder 72 shown in FIGS. 13, 14 and 15.

Figure 7:
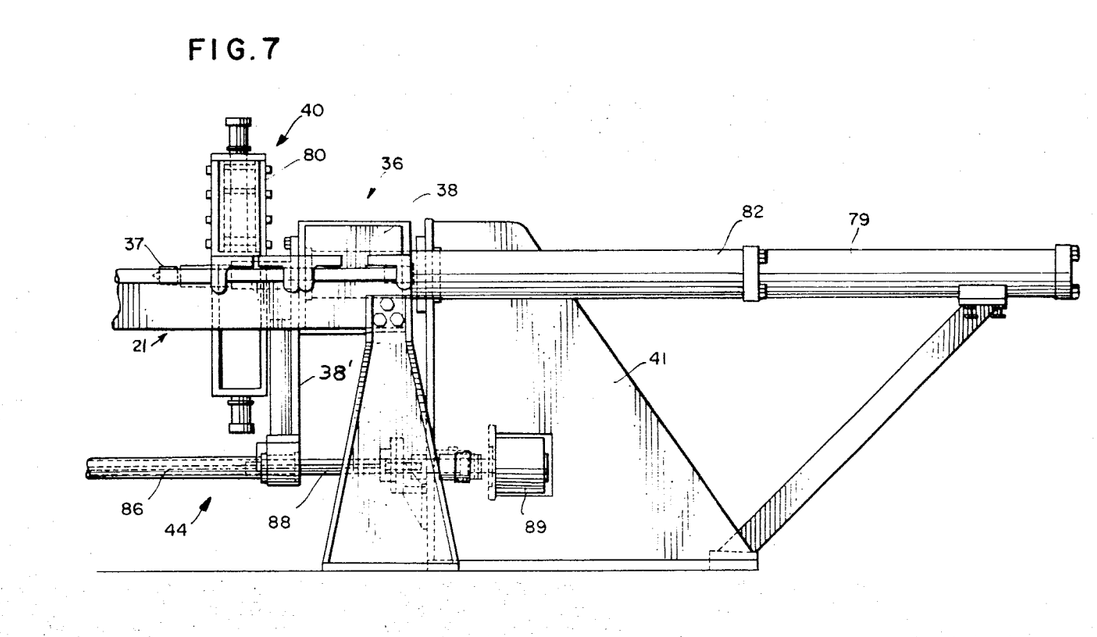
FIG. 7 is a fragmentary elevational view of the apparatus of FIG. 1 illustrating the tail section including a tail stock and work piece extractor.
Figure 8:
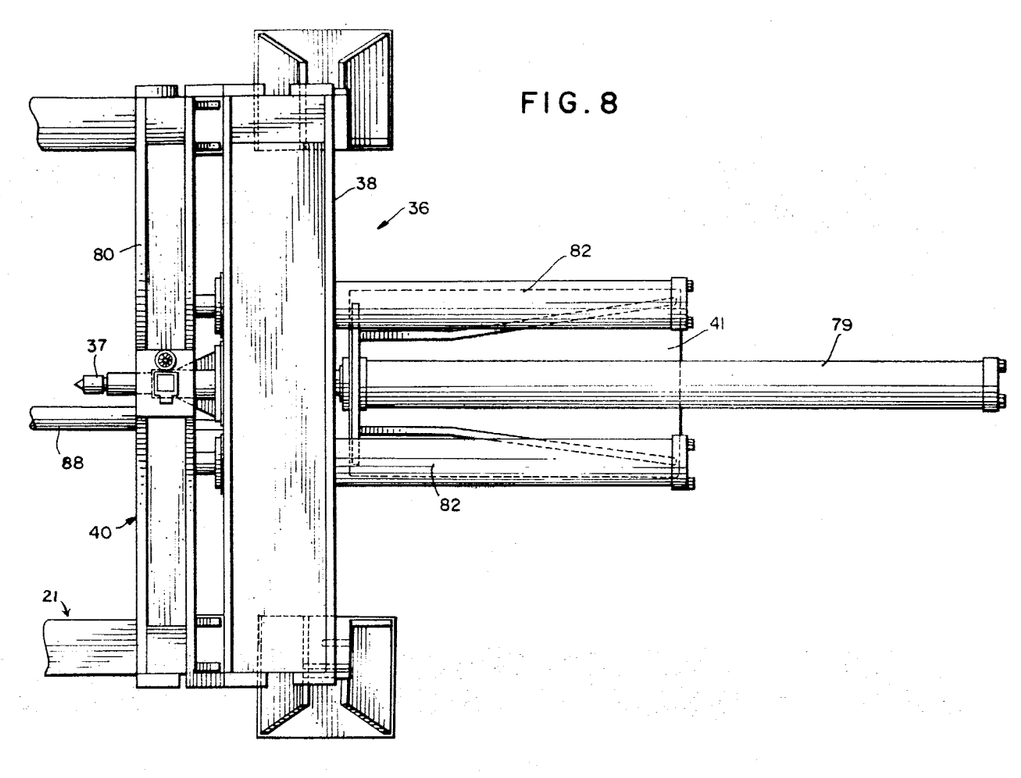
FIG. 8 is a plan view of FIG. 7.
Figure 9:
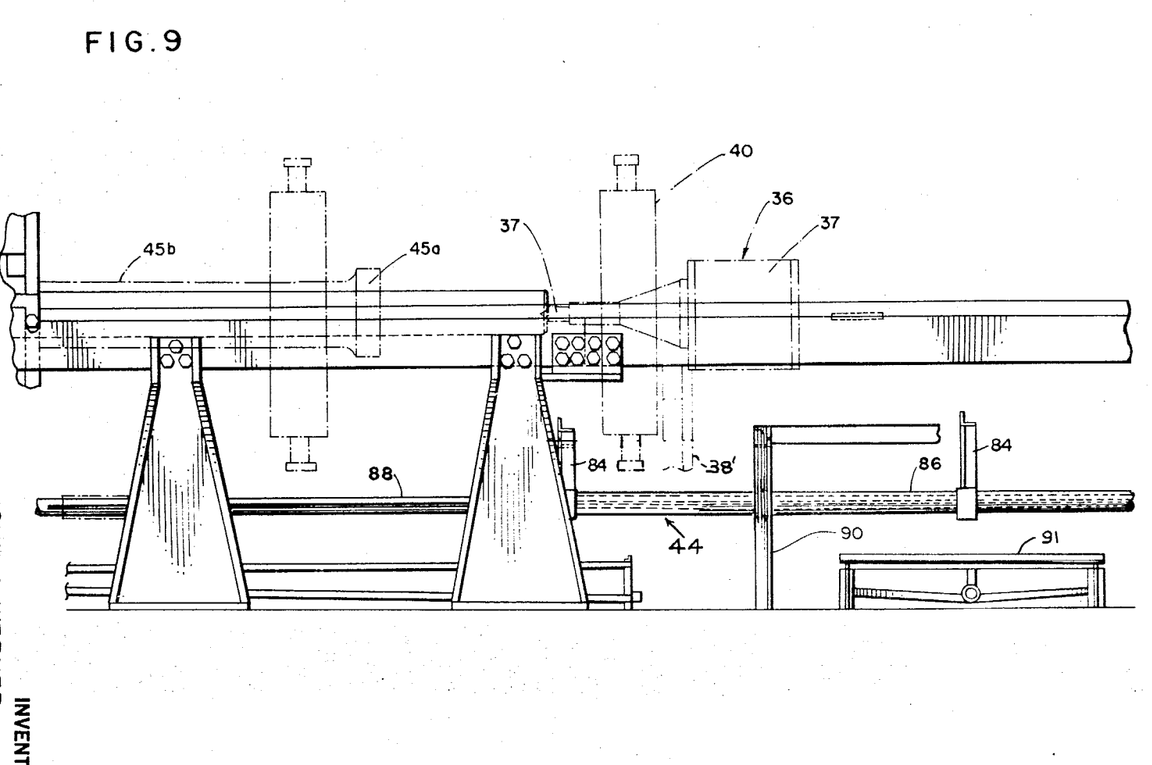
FIG. 9 is a fragmentary elevational view of the apparatus of FIG. 1, illustrating the work area between the head and tail ends of the apparatus.

To provide for steadying the free end of the mandrel 25, there is provided the tail stock assembly 36 having the center means 37, the structure and operation of which can be best understood from FIGS. 7, 8, 9 and 11. Referring specifically to these figures, the tail stock assembly 36 is retractable along the machine bed 21 away from the end of the mandrel 25 to permit loading and unloading of the work piece 45 onto the mandrel. As is known in the machine art, the center means 37 comprises a live center V-shaped point engageable within a center point in the mandrel 25 as best illustrated in phantom in FIG. 9. Moreover, an hydraulic cylinder 79, FIGS. 7 and 8, is provided interacting between the tail post 41 and the support 38 of the center means 37 to provide for advancing of the tail stock assembly 36 into engagement with the mandrel 25.

To provide for pulling a finished work piece 45 off of the mandrel 25, there is provided the extractor assembly 40 (FIG. 7). The extractor structure 40 includes an extractor frame 80 (FIG. 11) riding on the machine bed 21 and carrying a plurality of gripping jaws 81, FIG. 11, which are closeable to grip an end section 45a, FIG. 7, which has been left on the tube blank 45 after working of the tube portion 45a. To this end, the extractor 80 is connected by suitable hydraulic cylinders 82 (FIGS. 7 and 8) with the support 38 of the tail stock assembly 36. Accordingly, the extractor assembly 40 will advance along the bed 21 of the machine 20 with the advance of the tail stock assembly 36. Additionally the extractor assembly 40 may be advanced or retracted relative to the tail stock assembly 36 through operation of the hydraulic cylinders 82.

To provide for the mechanical loading and unloading of work pieces 45 (FIG. 11) onto the mandrel 25, (FIG. 1), there is provided the loading cradle assembly 44, FIGS. 2, 7, 11, and 12. The cradle assembly 44 includes three pairs of arms 83, 84, (FIGS. 3 and 4), the arms 83 being fixed to a sleeve 85, and the arms 84 being fixed to a sleeve 86. The sleeves 85 and 86 in turn are slideably mounted on axially fixed, parallel spline shafts 87, 88, respectively, which are journaled at their forward ends on the machine head 23, and at their rear ends on the tail post 41. The support 38 of the tail stock 36 has a depending bracket 38' (FIG. 7) in which the sleeves 85, 86 are journaled at their rear ends and retained against axial displacement relative to the tail stock 36. Each of the loader arms 83 and 84 is provided with respective shoulders 83a, 84a, FIGS. 11 and 12, on the inner upper edges to provide a support for the work piece. Suitable means including an hydraulic motor 89, FIG. 7, on the tail post 4, are provided for rotating the spline shafts 87, 88 back and forth in opposite directions and thereby pivoting each pair of the arms 83 and 84 together in a scissors-like motion, from the position illustrated in solid lines in FIG. 11, to the position illustrated in solid lines in FIG. 12 in which they hold a work piece 45 on the shoulders 83a, 84a. The hydraulic motor 89 and associated drive means are so arranged as to permit the arms 83 and 84 of each pair to swing toward each other a sufficient distance to provide, in the absence of a work piece, some overtravel of the arms relative to each other which will enable the loader arms to grip work pieces of various diameters.

Figure 11:
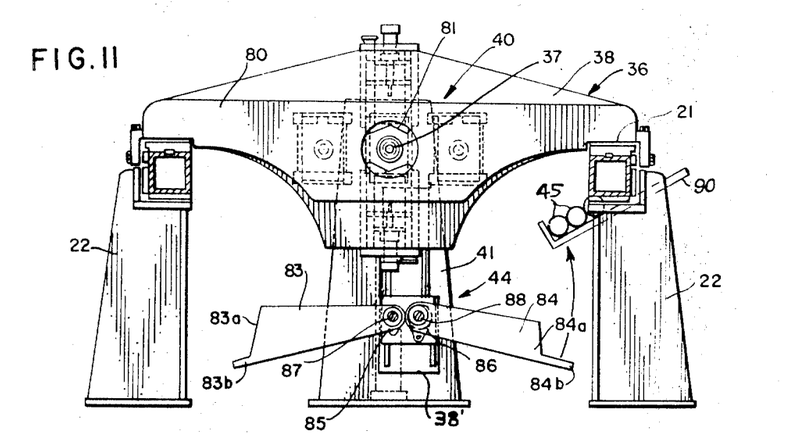
FIG. 11 is a sectional elevational view of the apparatus of FIG. 1, taken along line 11—11 of FIG. 2, and illustrating the tail stock and extractor of the apparatus.

Moreover, the ends of the arms 83 and 84 above the shoulders 83a and 84a define projections 83b, 84b, respectively, FIGS. 11 and 12, to provide for lifting of work pieces 45, one at a time, from a suitable rack, such as a rack 90 illustrated in FIG. 11, and to elevate and center the work piece with the mandrel 25. The loader mechanism comprising the sleeves 85, 86 and associated arms 83, 84 is coupled to the tail stock 36 by the axially fixed connections of the sleeves 85, 86 with the depending bracket 38' of the tail stock support 38. Consequently, the pairs of arms 83 and 84 advance as a unit with the tail stock assembly 36 so that when the tail stock assembly 36 is retracted, the arms 83 and 84 are retracted beyond the end of the mandrel 25, and are thereby operable to elevate a work piece into axial alignment with the mandrel 25. Advance of the tail stock assembly 36 then will load the work piece onto the mandrel 25. The arms 83 and 84 will then swing down, as indicated in phantom in FIG. 12, out of the way of the tool carriage 30 and of the extractor assembly 40 during the working of the work piece 45.

From the above detailed description of the improved tube working machine, its operation is believed clear. Moreover, it will be understood that the machine may be under the manual control of an operator, or may be set to function automatically. Briefly, referring to FIGS. 1 through 4, the improved tube working machine as illustrated in FIGS. 1 and 2 is shown in its unloaded or at rest position. In accordance with one production machine under the semi-automatic control of an operator, the operation of the machine is initiated by an operator through a suitable switch which opens a valve to the hydraulic motor 89 (FIG. 2) that pivots the arms 83 and 84 upwardly, causing the arms 84 to pick up a tube blank 45 from the rack 90 with the projection 84b, FIG. 11. As the arms 83 and 84 continue their upward movement, they carry the tube blank 45 upwardly, aligning the tube blank with the mandrel 25 in the space between the latter and the retracted tail stock 36. When the tube blank gets up in place along the work axis of the machine, a switch actuated by one of the loader arms is tripped and causes the entire loading cradle assembly 44, along with the tail stock assembly 38 and the extractor assembly 40, to move toward the head assembly 23. The tube blank is then advanced on the mandrel into chuck position and the mandrel is engaged by the center 37 of the tail stock assembly 36. As the tail stock assembly 36 gets seated, it strikes an additional switch which stops the forward movement of the tail stock and extractor assembly, as well as of the cradle assembly, and causes the arms 83 and 84 to go down. Movement of the arms down actuates an interlock switch which has locked out the drive for the tool carriage 30 and extractor assembly 40, so long as the arms were in the way of the tool carriage and extractor assembly. At this point the work piece 45 is loaded in the machine, as indicated in FIGS. 3 and 4. Moreover, the tail stock assembly is now in position to steady the free end of the mandrel 25 as also indicated in FIGS. 3 and 4.

With the tube working machine 20 loaded, the operator can begin working the blank by closing a switch to begin rotation of the chuck-mandrel assembly. The rollers 34, 34' and 34" are then brought into the pre-set depth by admission of pressure fluid to the outer ends of the roller shift cylinders 60. It will be understood, of course, that the working depth of the roller 34 is set by the high surface 71 of the gauge block 68, and that the working depths of the rollers 34' and 34" are correspondingly set by the high surface 71 of their associated gauge blocks. Moreover, it is understood that the working process takes place with a coolant to prevent heat from the plastic flow area from overheating adjacent portions of the mandrel 25. Starting up of the carriage 30 drives the rollers 34 into the work piece 45 to the pre-selected depth, thereby subjecting the work piece to a radial and axial deforming pressure. The tool carriage 30 dwells at its initial position for a few seconds to fully seat the rollers by their pressurized roller shift cylinders 60 as the chuck-mandrel assembly turns. After a few seconds delay the tool carriage will advance to feed the rollers longitudinally of the work piece. It has been found that a two pass operation provides very satisfactory results. Accordingly, the machine is cycled so that as the tool carriage 30 advances to near the free end of the work piece, it strikes a switch which opens the rollers and returns the carriage to its at rest position. At the same time the chuck-mandrel assembly stops rotating and the hydraulic cylinders 72 shift the gauge blocks 68 so that upon subsequent resumption of the chuck-mandrel rotation the rollers 34, 34' and 34" will be fed to a predetermined depth under the control of the surfaces 70 of the gauge blocks 68; the amount of in-feed corresponding to the step $t$ in FIG. 15.

With the machine reset, the operator initiates the second or final pass of the tool carriage for a repeat working travel of the rollers along the work piece 45. When the carriage completes its second pass, it strikes a second switch which again is effective to open the rollers, return the tool carriage 30 to its at rest position, and reactivate the hydraulic cylinders 72 to reset the gauge blocks 68 for the first pass on a subsequent tube blank. At the same time the tube extractor assembly 40 moves toward the work piece, illustrated in phantom in FIG. 9, until it strikes a switch, causing the jaws 81 to close and automatically to reverse the direction of the retractor to pull the work piece 45 from the mandrel 25. As the tube extractor retracts, it strikes a switch which starts the tail stock back so that the tail stock moves back with the extractor and tube fastened to it. As the tail stock assembly retracts, it strikes a switch which brings up the arms 83 and 84 of the loader assembly 44 so that the arms raise to hold and support the finished work piece. As the tail stock continues its retraction it strikes an additional switch which is effective to stop the retraction of the tail stock and to open the jaws 81. The extractor, of course, continues its retraction so as to clear the end of the finished work piece on the raised loader arms 83, 84. As the extractor retracts, it strikes an additional switch which is effective to open the arms 83 and 84 in a direction to unload the finished work piece 45 onto a conveyor or other suitable means 91 (FIGS. 2 and 4). At the conclusion of the retraction of the extractor, the extractor strikes a switch which stops the retraction of the extractor. At this point the machine has completely re-cycled itself.

It is claimed and desired to secure by Letters Patent:

1. An apparatus for working metal tubes and like work pieces, comprising:
   a horizontal, elongated machine bed;
   a machine head at one end of said bed including a power driven chuck and an overhanging mandrel engageable with a tubular work piece and operable to rotate the latter on a horizontal axis extending longitudinally of said bed;
   a tail stock reciprocably mounted on said bed for advance movemen into cooperating engagement with the free end of said mandrel and for retracting movement therefrom;
   loading means shiftably mounted on said bed for horizontal back and forth movement longitudinal thereof;
   coupling means operatively associated with said loading means and tail stock for transmitting back and forth movement of the latter to said loading means;
   said loading means being operable to position a tubular work piece between the retracted tail stock and said mandrel in axial alignment with the latter, and to shift said work piece axially upon and from said mandrel; and
   tool means shiftably mounted on said bed for movement longitudinally thereof in cooperative engagement with a work piece on said mandrel.

2. An apparatus as set forth in claim 1, wherein said loading means comprise at least one pair of cradle arms; and rotary support means for said arms mounting the latter for swinging movement upwardly toward and downwardly away from each other in underlying relation to and transversely of the axis of said mandrel.

3. An apparatus as set forth in claim 2, wherein said cradle arms are provided with work piece supporting shoulders at their swinging ends.

4. An apparatus as set forth in claim 2, and further comprising actuating means for said cradle arms operable to swing the latter upwardly toward each other a sufficient distance to provide over-travel of the arms relative to each other in the absence of a work piece.

5. An apparatus as set forth in claim 1, and further comprising work piece extractor means reciprocably mounted on said bed at the side of said tail stock facing said mandrel; and shift means for said extractor means mounted on said tail stock and operable to advance and retract said extractor means relative to said tail stock.

6. An apparatus as set forth in claim 1 wherein said tool means comprise a carriage frame mounted on said bed for horizontal back and forth movement longitudinally thereof; a plurality of forming rollers circumferentially spaced about the axis of said mandrel and adapted to apply radial and axial deforming pressure to a tubular work piece on said mandrel; and a mounting for each of said rollers comprising:
   an hydraulic cylinder assembly carried by said carriage frame and including a cylinder closed at both ends;
   a piston in said cylinder;
   a pair of piston rods connected to said piston, one extending through one end of said cylinder toward said mandrel and the other extending outward through the other end of said cylinder;
   means rotatably mounting the respective roller on said one piston rod; and
   selectively adjustable gauge means operatively interposed between said cylinder and the outward extending portion of said other piston rod for stopping advance movement of said roller toward said mandrel at predetermined radial distances from the latter.

7. An apparatus for cold working metal tubes and like work pieces and comprising:
   a machine bed;
   a machine head at one end of said bed including a chuck for gripping a work piece and a power driven head stock for turning said chuck; said machine head being adapted to secure one end of an elongated mandrel for rotation with said chuck and defining a work axis;
   a tool carriage movable along said bed relative to said machine head and carrying tool means movable generally radially of said work axis;
   loading means for loading a work piece onto said mandrel with an end thereof gripped by said chuck,
   tail stock means carried by said machine bed including center means for engagement with a mandrel;
   a plurality of forming rollers circumferentially spaced about the axis of said mandrel and adapted to apply radial and axial deforming pressure to a tubular work piece on said mandrel; and
   a mounting for each of said rollers, comprising:
      an hydraulic cylinder assembly carried by said carriage and including a cylinder closed at both ends;
      a piston in said cylinder;
      a pair of piston rods connected to said piston, one extending through one end of said cylinder toward said mandrel and the other extending outward through the other end of said cylinder;
      means rotatably mounting the respective roller on said one piston rod; and
      selectively adjustable gauge means operatively interposed between said cylinder and the outward extending portion of said other piston rod for stopping advance movement of said roller toward said mandrel at predetermined radial distances from the latter.

8. An apparatus as set forth in claim 7 wherein said hydraulic cylinder assembly is adjustably mounted on said carriage frame for back and forth movement radially of said work axis.

9. An apparatus for cold working metal tubes and like work pieces and comprising:
   a machine bed;
   a machine head at one end of said bed including a chuck for gripping a work piece and a power driven head stock for turning said chuck; said machine head being adapted to secure one end of an elongated mandrel for rotation with said chuck and defining a work axis;
   a tool carriage movable along said bed relative to said machine head and carrying tool means movable generally radially of said work axis;
   loading means for loading a work piece onto said mandrel with an end thereof gripped by said chuck;
   tail stock means carried by said machine bed including center means for engagement with a mandrel;
   a plurality of rollers disposed radially to said work axis;
   said tool carriage including a carriage frame;
   a stepped thickness block having a longitudinal slot, the step in said block providing accurately gauged thickness portions;

an hydraulic cylinder assembly carried by said carriage frame and including a cylinder closed at both ends;
a piston in said cylinder;
a pair of piston rods connected to said piston extending out opposite ends of said cylinder, one of said piston rods being connected to advance one of said rollers and the other of said piston rods extending through said slot;
an enlargement on said other of said piston rods seatable on said block; and
means for shifting said block to selectively seat said enlargement on said thickness portions of said block.

References Cited

UNITED STATES PATENTS

| | | | |
|---|---|---|---|
| 557,791 | 4/1896 | Findlay | 72—85 |
| 1,270,402 | 6/1918 | Fulton | 72—85 |
| 1,794,424 | 3/1931 | Smith et al. | 82—2.5 |
| 3,137,259 | 6/1964 | Sporck | 72—83 |
| 3,182,475 | 5/1965 | Dilling | 72—77 |

RICHARD J. HERBST, Primary Examiner

U.S. Cl. X.R.

72—85